United States Patent
Lynch

(10) Patent No.: US 6,177,603 B1
(45) Date of Patent: Jan. 23, 2001

(54) ORGANO ZINC AND RARE EARTH CATALYST SYSTEM IN THE POLYMERIZATION OF CONJUGATED DIENES

(75) Inventor: Thomas J. Lynch, Akron, OH (US)

(73) Assignee: Bridgestone Corporation, Tokyo (JP)

( * ) Notice: Under 35 U.S.C. 154(b), the term of this patent shall be extended for 0 days.

(21) Appl. No.: 09/096,905

(22) Filed: Jun. 12, 1998

(51) Int. Cl.$^7$ ........................................................ C07C 2/02
(52) U.S. Cl. .......................... 585/507; 585/502; 585/506; 585/511
(58) Field of Search ..................... 585/502, 506, 585/507, 511

(56) References Cited

U.S. PATENT DOCUMENTS

| | | |
|---|---|---|
| 2,921,060 | 1/1960 | Stuart . |
| 3,070,549 | 12/1962 | Ziegler et al. . |
| 4,092,268 | * 5/1978 | De Zarauz ............................ 502/153 |
| 4,129,705 | 12/1978 | de Zarauz . |
| 4,384,982 | 5/1983 | Martin . |
| 4,518,753 | * 5/1985 | Richards et al. ...................... 526/177 |
| 4,611,038 | 9/1986 | Brun et al. . |
| 4,689,368 | * 8/1987 | Jenkins ................................. 525/247 |
| 5,159,022 | * 10/1992 | Ikematu et al. ........................ 525/250 |
| 5,686,371 | * 11/1997 | Ansell et al. .......................... 502/102 |

FOREIGN PATENT DOCUMENTS 87102388   2/1987   (EP) .

OTHER PUBLICATIONS

"Butadiene polymerization With a Rare Earth Compound Using a Magnesium Alkyl Cocatalyst: 2" by D.K. Jenkins, *Polymer*, vol. 26, pp. 152–158, Jan., 1985.

* cited by examiner

*Primary Examiner*—Elizabeth D. Wood
(74) *Attorney, Agent, or Firm*—David G. Burleson; Arthur M. Reginelli

(57) ABSTRACT

The instant invention provides a process for substantially reducing the polymer cement viscosity or reducing the molecular weight distribution of the a conjugated diene polymer synthesized by using a charge of catalytically effective amounts of a rare earth catalyst and an organo magnesium component by adding an organo zinc component to the charge in an amount and under conditions sufficient to reduce the polymer cement viscosity. The invention also contemplates a catalyst compostion for substantially reducing the polymer cement viscosity of a polymer product as well the resultant polymer product.

17 Claims, No Drawings

ORGANO ZINC AND RARE EARTH CATALYST SYSTEM IN THE POLYMERIZATION OF CONJUGATED DIENES

FIELD OF THE INVENTION

The present invention relates to the use of diethylzinc to reduce the viscosity of the polymer cement in the rare earth catalyzed polymerization of butadiene.

BACKGROUND OF THE INVENTION

Problems have existed in the synthesis of polyconjugated dienes broadly and specifically in the synthesis of polybutadiene, including: the reduction the polymer cement viscosity in the polymer product; suppression of gel formation in the reaction mass; and, the reduction of a broad weight distribution in the polymer product.

The use of various catalyst systems containing rare earth compounds for the polymerization of conjugated diene monomers has been disclosed. Examples of such disclosures are (1) Mazzei A., Makromol. Chem. Suppl. 4 61 (1981); (2) Witte J., Angew. Makromol. Chem. 94 119 (1981); (3) Shen Tse-Chuan et al, J. Pol. Sci. Polym. Chem. Ed. 18 3345 (1980); (4) Marwede G. and Sylvester G., Trans. 22nd Annual Proceedings of the International Institute of Synthetic Rubber Producers, Madrid Paper III-3 (1981). Such catalyst systems have two or three components, for example a lanthanoid alkyl, alkoxide or salt (e.g. neodymium tricarboxylate) with an organoaluminium compound and optionally a Lewis Acid. When used in the polymerization of conjugated dienes, they yield a product which has a high content of cis isomer (e.g. 98% for polybutadiene and 94% for polyisoprene)

Diethylzinc (hereinafter referred to as "$Et_2Zn$") is well known as a chain transfer agent in the Zeigler-Natta polymerizations as described in J. Boor, "*Zeigler-Natta Catalysts and Polymerizations*", 1979, p375. Diethylzinc has also been used in BuLi and barium catalyzed polymerizations of butadiene as described in H. Hseih, *J Polym. Sci.*, Polym. Chem. Ed., Vol. 14, p379–386, 1976; and, U.S. Pat. Nos. 4,129,705 and 4,092,268, to de Zaraux. EP Patent Application No. 0234 512 to Takeshi, teaches that $Et_2Zn$ can be used in combination with rare earth catalyzed polymerizations of butadiene, as a third, nonessential catalyst component of the system. However, Takeshi makes no disclosure that $Et_2Zn$ may be used reduces the viscosity of the polymerization.

Thus, there exists a long felt need to vary the molecular weight of polybutadienes during synthesis; more particularly, to reduce the polymer cement viscosity of polybutadienes during their synthesis. The instant invention purports to solve all of the foregoing problems without noticeably affecting the rate of the polymerization or the microstructure of the resultant polymer.

OBJECTS OF THE INVENTION

It is an object of the present invention to provide a three component catalyst system for the polymerization of butadiene.

More specifically, it is an object of the invention to provide an organo zinc component such as $Et_2Zn$ to augment the primary rare earth organic salt and dialkylmagnesium components of a catalyst system for polymerizing butadiene.

Still more specifically, it is the primary object of the present invention to substantially reduce the polymer cement viscosity of the polymerization reaction mass as a direct and proximate result of adding the third organo zinc component to the catalyst system.

Moreover, as a direct and proximate result of the addition of the organo zinc component to the catalyst system, it is an object of the invention to substantially suppress gel formation and substantially reduce the molecular weight distribution of the reaction mass during high temperature polymerization of butadiene in the presence of catalytically effective amounts of primary rare earth organic acid salt and a dialkylmagnesium components.

Further, it is an object of the instant invention to add substantial catalytically effective amounts of organo zinc to respective catalytically effective amounts of a primary rare earth organic acid salt and a dialkylmagnesium components in the high temperature polymerization of butadiene, without substantially affecting the rate of polymerization or without adversely affecting the microstructure of the resultant polybutadiene polymer product.

Finally, it is the primary object of the instant invention to provide a catalyst system based upon a rare earth metal or a complex of a rare earth metal/dialkylmagnesium catalyst and an organo zinc component.

DETAILED DESCRIPTION OF THE INVENTION

The invention comprises a three component catalyst for the homopolymerisation of a conjugated diene or the copolymerisation of a conjugated diene with one or more other conjugated dienes comprising (a) a salt of a rare earth metal or a complex of a rare earth metal, (b) an organo magnesium compound and (c) an organo zinc in which the mole ratio of component (c) to component (a) is at least 3:1 and preferably in the range 5:1 to 20:1 and the use of such a catalyst in the polymerisation of a conjugated diene as aforesaid. This invention utilizes the addition of an organo zinc component to the catalyst system to substantially reduce the polymer cement viscosity or to reduce the molecular weight distribution in high temperature polymerizations of a conjugated diene polymer, particularly polybutadiene. Such polybutadienes are suitable as compounding agents for improving various properties such as impact strength of high impact polymers such as polystyrene.

The rare earth catalysts contemplated by the present invention are lanthanide catalysts, normally used in the polymerization of conjugated dienes, that form viscous or gelatinous homogenous solutions when added to solvents, such as aliphatic hydrocarbons, cycloaliphatic hydrocarbons and aromatic hydrocarbons, preferably hexane.

The rare earth element in component (a) of the catalyst may be any of those having an atomic number of 57 (lanthanum) to 71 (Jutetium). However, the polymerization activity of certain of these elements, e.g. samarium or europium, is known to be low. Therefore a compound of lanthanum, cerium, praseodymium, neodymium, gadolinium, terbium or dysprosium is preferred. A compound of two or more rare earth elements may be used. A compound of lanthanum, neodymium or "didymium" (which is a mixture of rare earth elements containing approximately 72% neodymium, 20% lanthanum and 8% praseodymium) is preferred. Preferably component (a) is soluble in hydrocarbon polymerization medium, examples being the carboxylates, alkoxides and diketones. Examples of compounds for use as component (a) are "didymium" versatate (derived from versatic acid, a synthetic acid composed of a mixture of highly branched isomers of C10 monocarboxylic acids, sold by Shell Chemicals), praseodymium (2,2,6,6-tetramethyl-3,5-heptane dione). Lanthanum, "didymium" and especially neodymium "versatate" are preferred on the grounds of ready solubility, ease of preparation and stability. Although the neodymium species of the disclosed rare earth catalysts are instantly preferred, the invention broadly relates to the polymerization of butadiene conducted in the presence of a catalyst system containing a compound of a rare earth element, i.e. an element having an atomic number of 57 to 71 inclusive.

The rare earth catalysts of the present invention are any complexes of a metal belonging to the series of the lanthanides having an atomic number of 57 to 71, in which a ligand is directly bound to the metal and is a monovalent and monodentate organic radical including but not limited to: $(-R^1CO_2)$, $(-OR^1)$, $(-NR^1R^2)$, $(-SR^1)$, $(-PR^1R^2)$ and $(-A(R^1)_n)_3$ wherein $R^1$ and $R^2$ are independently selected from alkyl, cycloalkyl and aryl hydrocarbon substituents having 1 to 20 carbon atoms. Suitable lanthanum rare earth compounds to be treated are represented by the following structures: $Ln(R^1CO_2)_3$, $Ln(OR^1)_3$, $Ln(NR^1R^2)_3$, $Ln(SR^1)_3$ and $Ln(PR^1R^2)_3$ and $Ln(A(R^1)_n)_3$, where Ln is a rare earth element in the lanthanum series having an atomic number of 57 to 71 and $R^1$ and $R^2$ are alkyl, cycloalkyl and aryl hydrocarbon substituents, or combinations thereof, having 1 to 20 carbon atoms. More specifically, $R^1$ and $R^2$ may also be independently selected from the group including: cycloalkylalkyl, alkylcycloalkyl, aryl, alkylaryl substitutents and combinations thereof. Even more specifically $R^1$ and $R^2$ may be independently selected from the group including: methyl, ethyl, n-propyl, isopropyl, n-butyl, isobutyl, t-butyl, n-amyl, isoamyl, n-hexyl, n-octyl, n-decyl, 2-ethyl hexyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl and combinations thereof.

Still more specifically, the lanthanum rare earth catalysts of the present invention include but are not necessarily limited to: lanthanum tris[bis(2-ethylhexyl)phosphate], lanthanum tris[dipropylamine], lanthanum tris[propylthio], lanthanum tris[propoxyl], lanthanum propionate, lanthanum diethylacetate, lanthanum 2-ethyl hexanoate, lanthanum stearate, lanthanum benzoate, cerium benzoate, praseodymium propionate, praseodymium cyclohexane carboxylate, praseodymium 2-ethyl hexanoate, neodymium neodecanoate, neodymium tris[bis(2-ethylhexyl)phosphate], neodymium diethyl acetate, neodymium 2-ethyl hexanoate, neodymium cyclohexane carboxylate, neodymium stearate, neodymium oleate and neodymium benzoate. Of the foregoing, the neodymium species are are most preferred.

In the formula $Ln(A(R^1)_n)_3$, A is a cation of a polyprotic inorganic acid, selected from the group of all polyprotic inorganic acids, including at least those species disclosed at page D-91 of the *Chemical Rubber Co., Handbook of Chemistry and Physics,* 48th Edition, (1967–1968). These polyprotic species include, but are not necessarily limited to: o-phosphoric, phosphoric, phosphorous, pyrophosporic, selenic, selenious, m-silicic, o-silicic, sulfuric, sulfurous, telluric, tellurous, o-boric, tetraboric, arsenic, arsenious, germanic, and any combinations thereof, and, n is the ionic charge of A.

Component (b) of the catalyst is an organo magnesium compound. Dihydrocarbyl magnesium compounds of formula $R_{(2)}Mg$ where each R, which may be the same or different, is for example, an alkyl (including cycloalkyl), aryl, aralkyl, allyl or cyclodiene group. Dialkyl magnesium compounds, where each alkyl group has from 1 to 10 carbon atoms, are preferred. Magnesium dibutyl is particularly preferred on the grounds of ease of availability. The organo magnesium compound may also be a hydrocarbon soluble Grignard reagent of formula RMgX where R is a hydrocarbyl group such as exemplified above and X is chlorine, bromine or iodine. Examples of the organomagnesium compounds used as component (b) contemplated by the instant invention may preferably include: dimethylmagnesium, diethylmagnesium, di-n-propylmagnesium, di-isopropylmagnesium, di-n-butylmagnesium, n-butyl sec-butylmagnesium, diisobutylmagnesium, di-sec-butylmagnesium, di-tertbutylmagnesium, di-n-hexylmagnesium, di-n-propylmagnesium, diphenylmagnesium. More are preferred by the instant invention are: diisobutylmagnesium, di-n-butylmagnesium, di-sec-butylmagnesium, di-tert-butylmagnesium, and combinations thereof.

The molar ratio of component (a) to component (b) is preferably 0.01:1 to 0.5:1, more preferably 0.06:1 to 0.3:1. Absolute concentration of component (b) may be for example, 1 to 5 millimoles per hundred grams of polymerisable monomer.

The organo zinc used by the instant invention as component (c) is represented by the following formula: $R^3$—Zn—$R^4$; wherein $R^3$ and $R^4$ are selected from hydrogen, aliphatic hydrocarbon groups or aromatic hydrocarbon groups which may be either the same or different, but both of $R^3$ and $R^4$ are not hydrogen. Aliphatic hydrocarbon groups contain from 1 to 20, preferably 2 to 10 carbon atoms and aromatic hydrocarbon groups contain from 6 to 20, preferably 6 to 14 carbon atoms.

Examples of such organo zinc compounds may include diethylzinc, di-n-propylzinc, di-iso-amylzinc, di-iso-butylzinc, and the like. Of the foregoing species, diethylzinc is the most preferred by the present invention.

The organo zinc compounds of the present invention are also useful in reducing the viscosity of highly viscous neodymium containing solutions by adding an organo zinc compound in the amounts useful in the catalyst system. The normally highly viscous neodymium containing solutions such as tris[bis(2-ethylhexyl)phosphate] solutions undergo a substantial reduction in viscosity when mixed with an organo zinc compound is represented by the following formula: $R^3$—Zn—$R^4$; wherein $R^3$ and $R^4$ are defined herein above.

The conjugated diene polymer broadly contemplated by the instant invention is obtained by polymerizing a conjugated diene hydrocarbon monomer having 4 to 12 carbon atoms, preferably 4 to 8 carbon atoms, in a molecule. Examples of the conjugated diene hydrocarbon monomer include, but are not necessarily limited to: 1,3-butadiene, 1,3-pentadiene, myrcene, piperylene, 2-methyl-1,3-butadiene, 2,3-dimethyl-1,3-butadiene, 1,3-hexadiene, octadiene, and the like. The conjugated diene hydrocarbon monomer may be used singly or as a mixture of two or more types. Among the foregoing named monomers, 1,3-butadiene is particularly preferable. Thus, the preferred conjugated diene polymer is polybutadiene.

The synthesis is carried out in hydrocarbon reaction diluent, for example, hexane, cyclohexane or toluene. It is very desirable that the catalyst components are soluble in the particular reaction diluent used. An aliphatic solvent, e.g. hexane, or cycloaliphatic solvent, e.g. cyclohexane, or toluene are preferred. Hexane is the most preferred diluent.

The lanthanide compound, the alkylmagnesium, alkylzinc and the butadiene are added to the polymerization reactor in the hydrocarbon diluent at a relative molar ratio within the range of from about 1:0.1:0:100 to about 1:50:50:100,000; more preferably from about 1:1:1:500 to about 1:20:20:50,000; still more preferably about 1:1.5:1.5:5,000 to about 1:15:15:20,000; and most preferably about 1:10:10:5,000–20,000.

The polymerization is preferably conducted under anaerobic conditions at a pressure from about slightly above vacuum up to 70 atmospheres; more preferably at about 0.5 atmospheres to about 10 atmospheres; and most preferably, at about atmospheric pressures.

Suitable temperature ranges for conducting the polymerization of the instant invention are from about 30° C. to about 130° C.; more preferably from about 40° C. to about 100° C.; and, most preferably about 70° C.

The following comparative examples show the effect of lowering the catalyst concentration or raising the temperature of the polymerization when a neodymium organic acid/dibutylmagnesium catalyst system is used to polymerize butadiene. The following examples are presented merely for purposes of illustration only and are not to be construed as limiting to the scope of the instant invention.

Comparative Examples 1–4

In Comparative Example 1, an oven dried 750 mL beverage bottle was capped with a crown cap and butyl liner. It was thereafter cooled under a stream of nitrogen and charged with 237 grams of a dry solution of butadiene (24.9 weight % in hexane). Thereinafter, the bottle was charged with 0.38 mL of neodymium neodecanoate (0.4 M in heptane) followed by the addition of 1.53 mL of $Bu_2Mg$ (1.0 M in heptane). The polymerization of the butadiene was carried out in a 50° C. water bath for 2 hours. It was thereafter noted that the polymer cement appeared gelatinous. The polybutadiene was isolated by precipitation in isopropanol and dried in a vacuum oven at 50° C. The polybutadiene yield was found to be 90%.

Comparative Examples 2 to 4 were conducted in a manner similar to that of Comparative Example 1 as described above. The conditions used, the observations on the polymer cement viscosity and the analytical results of Comparative Examples 1 to 4 are listed in Table 1. These results show that raising the polymerization temperature or lowering the catalyst concentration, generally resulted in lower yields and polymers with broad molecular weight distributions. Further, it was noted that even when yields were low, the polymer cements had a gelatinous appearance. Addition of isopropanol to theses gelatinous solutions resulted in a significant decrease in viscosity. In the following tables the ratios of catalyst components are expressed as molar ratios. The heading "mM Nd phg Bd" represents millimoles of neodymium catalyst per hundred grams of butadiene. "Pzn" represents polymerization. Yield % represents the percentage of monomer converted to polymer. $M_n$ is the number average molecular weight in 1000's and $M_w$ is the weight molecular weight in 1000's. PDI is the Polydispersity Index or the ratio of $M_w/M_n$. Tm(1) and Tm(2) represent the first and second melting points for the polymer.

TABLE 1

| Comp Example No. | mM Nd phg Bd | Mg/Nd | Polymerization viscosity | Pzn Temp (° C.) | Pzn time (Hr.) | Yield % | Mn × $10^{-3}$ g/mol | Mw × $10^{-3}$ g/mol | PDI $M_w/M_n$ | %1.4 Trans | %1.2 Vinyl | Tm(1) (° C.) | Tm(2) (° C.) |
|---|---|---|---|---|---|---|---|---|---|---|---|---|---|
| 1 | 0.26 | 10 | gel-like | 50 | 17.5 | 90 | 43.5 | 56 | 1.28 | 93 | 5 | 53 | 104 |
| 2 | 0.26 | 10 | gel-like | 80 | 4.0 | 84 | 42 | 80 | 1.90 | 93 | 5 | 44 | 92 |
| 3 | 0.10 | 10 | gel-like | 82 | 2.0 | 36 | 66 | 134 | 2.03 | 91 | 6 | 48 | 82 |
| 4 | 0.10 | 7.5 | gel-like | 80 | 18.0 | 26 | 78 | 280 | 3.33 | 88 | 6 | 47 | 84 |

EXAMPLES 1–4

In Example 1, an oven dried 750 mL beverage bottle was capped with a crown cap and butyl liner. The bottle was cooled under a stream of nitrogen and charged with 227 grams of a dry solution of butadiene (24.4 wt % in hexane) and 4.34 mL of neodymium neodecanoate (0.4 M in heptane). Thereinafter, the bottle was charged with 0.55 mL of $Bu_2Mg$ (1.0 M in heptane) followed by the addition 0.55 mL of diethylzinc (1.0 M in hexane). The polymerization of the butadiene was carried out in a 80° C. water bath for 2 hours. It was thereafter noted that the polymer cement did not have the gelatinous appearance that was observed in the polymerizations run without diethylzinc. The polybutadiene polymer was isolated by precipitation in isopropanol and dried in a vacuum oven at 50° C. The conversion rate of monomer to polymer or the yield was found to be 61%.

Examples 2 to 4 were conducted in accordance with the procedure of Example 1 as described above. The conditions used, the observations on the polymer cement viscosity and the analytical results of Examples 1 to 4 are listed in Table 2. From these results, it can readily be concluded that diethylzinc has a number of beneficial effects including the use of reduced amounts of catalyst. These results display that the use of diethylzinc promotes a breakdown of the gelatinous polymer cements to give a moderately viscous cement, a significant improvement in the yield and a narrowing of the molecular weight distribution while having no effect on the microstructure of the polymer.

TABLE 2

| Example No. | mMNd phgBd | Mg/Nd | Zn/Nd | pm visc | Yield % | Mn × $10^{-3}$ g/mol | Mw × $10^{-3}$ g/mol | PDI $M_w/M_n$ | %1.4 Trans | %1.2 Vinyl | Tm(1) (° C.) | Tm(2) (° C.) |
|---|---|---|---|---|---|---|---|---|---|---|---|---|
| 1 | 0.10 | 10 | 10 | moderately viscous | 58 | 41 | 66 | 1.60 | 93 | 6 | 43 | 95 |
| 2 | 0.10 | 10 | 10 | iscous | 61 | 45 | 74 | 1.65 | 93 | 5 | 44 | 95 |
| 3 | 0.10 | 10 | 20 | slightly viscous | 60 | 35 | 53 | 1.50 | 93 | 5 | 46 | 95 |
| 4 | 0.10 | 10 | 10 | viscous | 63 | 45 | 72 | 1.60 | 93 | 5 | 46 | 96 |

EXAMPLES 5–10

In Examples 5 to 10, a neodymium tris[bis(2-ethylhexyl) phosphate diester] was used as the rare earth organic acid salt. The polymerizations were carried out in a similar manner to the procedure described for Examples 1–4 at a polymerization temperature of 80° C. The polymerization conditions and results are summarized in Table 3.

The polymerization conditions and analytical results are shown in Table 4. It is clear from these results that it is possible to achieve a high level of conversion in a short period of time using a rare earth polymerization catalyst modified with diethylzinc.

TABLE 3

| Example No. | mMNd phgBd | Mg/Nd | Zn/Nd | pzn visc | Pzn time (Hr.) | Yield % | Mn × $10^{-3}$ g/mol | Mw × $10^{-3}$ g/mol | PDI $M_w/M_n$ | 1.4 Trans | 1.2- Vinyl | Tm(1) (° C.) | Tm(2) (° C.) |
|---|---|---|---|---|---|---|---|---|---|---|---|---|---|
| 5 | 0.10 | 7.5 | 0.0 | gel | 2.5 | 72 | gel | | | | | | |
| 6 | 0.10 | 7.5 | 1.9 | gel | 2.0 | 71 | gel | | | | | | |
| 7 | 0.10 | 7.5 | 3.8 | extremely viscous | 2.0 | 68 | 63 | 233 | 3.70 | | | 46 | 96 |
| 8 | 0.10 | 7.5 | 5.6 | viscous | 2.0 | 73 | 63 | 164 | 2.80 | | | 45 | 97 |
| 9 | 0.10 | 7.5 | 7.5 | moderately viscous | 2.0 | 69 | 55 | 121 | 2.20 | | | 45 | 95 |
| 10 | 0.10 | 7.5 | 10 | moderately viscous | 2.0 | 70 | 55 | 105 | 1.90 | 94 | 5 | 47 | 96 |

TABLE 4

| Example No. | mM Nd phg Bd | Mg/Nd | Zn/Nd | Pzn Temp (° C.) | Pzn Time (Hr.) | Yield % | Mn × $10^{-3}$ g/mol | Mw × $10^{-3}$ g/mol | PDI $M_w/M_n$ | Tm(1) (° C.) | Tm(2) (° C.) |
|---|---|---|---|---|---|---|---|---|---|---|---|
| 11 | 0.14 | 10 | 10 | 66 | 2.0 | 87 | 52 | 74 | 1.43 | 50 | 101 |
| 12 | 0.14 | 10 | 10 | 66 | 2.0 | 89 | 51 | 72 | 1.42 | 51 | 101 |
| 13 | 0.14 | 10 | 7.5 | 66 | 2.0 | 90 | 55 | 79 | 1.44 | 52 | 100 |

The results indicate that the use of neodymium phosphate diester catalyst results in higher yields than the corresponding neodymium carboxylate catalyst when higher polymerization temperatures are used. However, it is also clear that this catalyst yields gelled products. The beneficial effects of diethylzinc can be seen in the reduction of the molecular weight distribution and in the reduction of the polymer cement viscosity. It is noted that the amount of diethylzinc can be increased without producing any detrimental effects on the yield or on the microstructure of the polymer.

EXAMPLES 11–13

In Examples 11 to 13, an optimized set of polymerization conditions was used. These polymerizations were carried out in a similar manner to those described in the Example 1.

EXAMPLES 14–17

In Examples 14 to 17, polymerizations were carried out using a premixed catalyst solution in a similar manner to those described in the Example 1. These examples display another advantage of the diethylzinc catalyst system, namely that the diethylzinc can be added to the highly viscous neodymium tris[bis(2-ethylhexyl)phosphate diester] solution to produce a relatively non-viscous solution. This pretreatment of the rare earth solution in the absence of the butadiene and dialkyl magnesium has no effect on the polymerization results and makes the rare earth solution significantly easier to handle. The polymerization conditions used in Examples 14 to 17 and the analytical results from these polymerizations are summarized in Table 5.

TABLE 5

| Example No. | mM Nd phg Bd | Mg/Nd | Zn/Nd | Pzn Temp (° C.) | Pzn Time (Hr.) | Yield % | Mn × 10$^{-3}$ g/mol | Mw × 10$^{-3}$ g/mol | PDI M$_w$/M$_n$ | Tm(1) (° C.) | Tm(2) (° C.) |
|---|---|---|---|---|---|---|---|---|---|---|---|
| 14 | 0.14 | 10 | 10 | 64 | 1.0 | 60 | 31 | 35 | 1.16 | 49 | 101 |
| 15 | 0.14 | 10 | 10 | 64 | 2.0 | 83 | 41 | 50 | 1.22 | 51 | 102 |
| 16 | 0.14 | 10 | 10 | 64 | 3.0 | 89 | 45 | 55 | 1.24 | 51 | 102 |
| 17 | 0.14 | 10 | 10 | 64 | 4.0 | 91 | 47 | 63 | 1.33 | 50 | 101 |

Although the invention has been described with reference to particular means, materials and embodiments it is to be understood that the invention is not limited to the particulars disclosed and extends to all equivalents within the scope of the claims.

What is claimed is:

1. A process for the homopolymerization of conjugated diene monomers comprising:
polymerizing conjugated diene monomers in the presence of a catalytically effective amount of a rare earth catalyst, an organo magnesium catalyst, and an organo zinc compound, where the organomagnesium catalyst is defined by the formula R$_{(2)}$Mg or RMgX, where each R, which may be the same or different, is a hydrocarbyl group containing from 1 to about 10 carbon atoms, and X is chlorine, bromine, or iodine, and where the molar ratio of the organ zinc compound to the rare earth catalyst is at least 3.8:1.

2. The process of claim 1, wherein the monomer of said conjugated diene polymer is selected from the group consisting of 1,3-butadiene, 1,3-pentadiene, isoprene, myrcene, piperylene, 2-methyl-1,3-butadiene, 2,3-dimethyl-1,3-butadiene, 1,3-hexadiene, octadiene, and combinations thereof.

3. The process of claim 1, wherein the conjugated diene monomer is butadiene.

4. The process of claim 1, wherein the rare earth catalyst is characterized by a general formula selected from the group consisting of Ln(R$^1$CO$_2$)$_3$, Ln(OR$^1$)$_3$, Ln(NR$^1$R$^2$)$_3$, Ln(SR$^1$)$_3$, Ln(PR$^1$R$^2$)$_3$, and Ln(A(R$^1$)$_n$)$_3$, where Ln is a rare earth element in the lanthanum series having an atomic number of 57 to 71 and R$^1$ and R$^2$ are alkyl, cycloalkyl, cycloalkylalkyl, alkylcycloalkyl, aryl, alkylaryl substituents, or combinations thereof, having 1 to 20 carbon atoms, A is a cation of a polyprotic inorganic acid, and n is the ionic charge of A.

5. The process of claim 4, wherein said R$^1$ and R$^2$ are independently selected from the group consisting of methyl, ethyl, n-propyl, isopropyl, n-butyl, isobutyl, t-butyl, n-amyl, isoamyl, n-hexyl, n-octyl, n-decyl, 2-ethyl hexyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl and combinations thereof.

6. The process of claim 1, wherein said rare earth catalyst is selected from the group consisting of neodymium neodecanoate, a neodymium tris[bis(2ethyl hexyl) phosphate] and combinations thereof.

7. The process of claim 1, wherein the organo magnesium catalyst is selected from the group consisting of dimethylmagnesium, diethylmagnesium, di-n-propylmagnesium, di-isopropylmagnesium, di-n-butylmagnesium, n-butyl sec-butylmagnesium, diisobutylmagnesium, di-sec-butylmagnesium, di-tertbutylmagnesium, di-n-hexylmagnesium, di-n-propylmagnesium, diphenylmagnesium.

8. The process of claim 1, wherein the organo zinc compound is represented by the following formula: R$^3$—Zn—R$^4$; wherein R$^3$ and R$^4$ are independently selected from the group consisting of hydrogen, aliphatic hydrocarbon groups and aromatic hydrocarbon groups but both R$^3$ and R$^4$ are not hydrogen.

9. The process of claim 1, wherein the organo zinc compound is selected from the group consisting of diethylzinc, di-n-propylzinc, di-iso-amylzinc, and di-iso-butylzinc.

10. The process of claim 1, wherein the molar ratio of the rare earth catalyst to the organo magnesium catalyst (b) is 0.01:1 to 0.5:1.

11. The process of claim 9, wherein said process is conducted under anaerobic conditions at a temperature of about 30° C. to about 130° C.

12. The process of claim 1, where the molar ratio of the organo zinc compound to the rare earth catalyst is from about 5:1 to about 20:1.

13. A process for the synthesis of conjugated diene polymers comprising:
polymerizing conjugated diene monomers in the presence of a catalytically effective amount of a rare earth-based catalyst, where the rare earth-based catalyst is formed by combining (a) a salt of a rare earth metal or a complex of a rare earth metal, (b) an organomagnesium compound, and (c) an organo zinc compound, where the molar ratio of the organo zinc compound to the rare earth metal salt or complex is at least 3.8:1.

14. The process of claim 13, where the molar ratio of the organo zinc compound to the rare earth catalyst is from about 5:1 to about 20:1.

15. The process of claim 13, wherein the rare earth catalyst is characterized by a general formula selected from the group consisting of Ln(R$^1$CO$_2$)$_3$, Ln(OR$^1$)$_3$, Ln(NR$^1$R$^2$)$_3$, Ln(SR$^1$)$_3$, Ln(PR$^1$R$^2$)$_3$, and Ln(A(R$^1$)$_n$)$_3$, where Ln is a rare earth element in the lanthanum series having an atomic number of 57 to 71 and R$^1$ and R$^2$ are alkyl, cycloalkyl, cycloalkylalkyl, alkylcycloalkyl, aryl, alkylaryl substituents, or combinations thereof, having 1 to 20 carbon atoms, A is a cation of a polyprotic inorganic acid, and n is the ionic charge of A.

16. The process of claim 13, wherein the organo zinc compound is represented by the following formula: R$^3$—Zn—R$^4$; wherein R$^3$ and R$^4$ are independently selected from the group consisting of hydrogen, aliphatic hydrocarbon groups and aromatic hydrocarbon groups but both R$^3$ and R$^4$ are not hydrogen.

17. The process of claim 13, wherein said organo magnesium catalyst is selected from the group consisting of R$_{(2)}$Mg and RMgX wherein each R is independently selected from the group consisting of an alkyl, aryl, aralkyl, allyl and cyclodiene group and X is chlorine, bromine or iodine.

* * * * *